US011785521B2

(12) United States Patent
Bhatti et al.

(10) Patent No.: US 11,785,521 B2
(45) Date of Patent: Oct. 10, 2023

(54) SYSTEMS AND METHODS FOR ANCHOR SELECTION IN A NON-STANDALONE WIRELESS NETWORK ENVIRONMENT

(71) Applicant: Verizon Patent and Licensing Inc., Basking Ridge, NJ (US)

(72) Inventors: Muhammad Yasir Nazir Bhatti, Prosper, TX (US); Shaun Robert Pola, Austin, TX (US); Gunjan Thakkar, McKinney, TX (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 51 days.

(21) Appl. No.: 17/492,972

(22) Filed: Oct. 4, 2021

(65) Prior Publication Data

US 2022/0030497 A1    Jan. 27, 2022

Related U.S. Application Data

(63) Continuation of application No. 16/822,059, filed on Mar. 18, 2020, now Pat. No. 11,172,422.

(51) Int. Cl.
*H04W 36/32* (2009.01)
*H04W 36/08* (2009.01)
(Continued)

(52) U.S. Cl.
CPC ........... *H04W 36/32* (2013.01); *H04W 16/28* (2013.01); *H04W 36/0011* (2013.01);
(Continued)

(58) Field of Classification Search
CPC . H04W 36/32; H04W 16/28; H04W 36/0011; H04W 36/08; H04W 36/14; H04W 64/003; H04W 36/02
See application file for complete search history.

(56) References Cited

U.S. PATENT DOCUMENTS 10,085,183 B2 * 9/2018 Lei .................. H04W 36/00837
10,333,594 B2   6/2019 Jung et al.
(Continued)

OTHER PUBLICATIONS

"5G Implementation Guidelines", Future Networks, Mar. 2019 (available at https://www.gsma.com/futurenetworks/wiki/5g-implementation-guidelines, visited Feb. 18, 2020).
(Continued)

*Primary Examiner* — Khawar Iqbal

(57) ABSTRACT

A system described herein may provide a technique for the intelligent, automated, and dynamic selection of anchor evolved Node Bs ("eNBs") for Next Generation Node Bs ("gNBs") in a Non-Standalone ("NSA") wireless network environment. An eNB may be selected as an anchor eNB based on distance to a particular gNB, and one or more sectors of the anchor eNB may be selected as anchors based on coverage areas associated with the sectors. Sectors of additional eNBs may be identified based on frequent handovers between the identified sectors of the anchor eNB and sectors of the additional eNBs. Selected eNBs and/or sectors may be notified of the designation as an anchor, and may thus provide gNB carrier information to connected User Equipment ("UE"), which may facilitate the connection of such UEs to the gNB.

20 Claims, 9 Drawing Sheets

(51) Int. Cl.
*H04W 16/28* (2009.01)
*H04W 64/00* (2009.01)
*H04W 36/00* (2009.01)
*H04W 36/14* (2009.01)

(52) U.S. Cl.
CPC .......... *H04W 36/08* (2013.01); *H04W 36/14* (2013.01); *H04W 64/003* (2013.01)

(56) References Cited

U.S. PATENT DOCUMENTS

| | | | |
|---|---|---|---|
| 10,499,294 | B1 | 12/2019 | Tayal et al. |
| 10,517,009 | B2 | 12/2019 | Zetterberg et al. |
| 10,638,282 | B2 | 4/2020 | Shi et al. |
| 11,405,971 | B2 * | 8/2022 | Jain ................ H04W 72/56 |
| 11,490,282 | B2 * | 11/2022 | Jha ................. H04W 76/15 |
| 11,558,846 | B2 * | 1/2023 | Akkarakaran ........ G01S 5/0236 |
| 11,659,517 | B2 * | 5/2023 | Sivavakeesar ........ H04W 76/27 |
| | | | 455/458 |
| 2015/0173004 | A1 | 6/2015 | Nigam et al. |
| 2016/0165492 | A1 * | 6/2016 | Lei .................. H04W 48/16 |
| | | | 455/438 |
| 2017/0105165 | A1 | 4/2017 | Nagasaka et al. |
| 2017/0311217 | A1 | 10/2017 | Jung et al. |
| 2019/0037417 | A1 * | 1/2019 | Lei ................. H04W 16/32 |
| 2019/0037468 | A1 | 1/2019 | Bongaarts et al. |
| 2019/0159076 | A1 | 5/2019 | Kim |
| 2019/0261198 | A1 | 8/2019 | Sarkar et al. |
| 2020/0015196 | A1 * | 1/2020 | Sivavakeesar ........ H04W 88/08 |
| 2020/0052743 | A1 | 2/2020 | Ryu et al. |
| 2020/0252808 | A1 | 8/2020 | Zhao et al. |
| 2020/0288338 | A1 | 9/2020 | Freda et al. |
| 2020/0314663 | A1 | 10/2020 | Wang et al. |
| 2020/0389805 | A1 | 12/2020 | Kim et al. |
| 2021/0014718 | A1 | 1/2021 | Li et al. |
| 2021/0044993 | A1 * | 2/2021 | Jha .................. H04L 5/0096 |
| 2022/0264411 | A1 * | 8/2022 | Zhang ............... H04W 36/32 |
| 2022/0264414 | A1 * | 8/2022 | Hu ................... H04W 24/02 |
| 2022/0346000 | A1 * | 10/2022 | Baek ................. H04L 5/0048 |
| 2023/0083089 | A1 * | 3/2023 | Venkatachari ........ H04B 7/0802 |
| 2023/0121194 | A1 * | 4/2023 | Tindola ........... H04W 36/00837 |
| | | | 370/331 |

OTHER PUBLICATIONS

"LTE eNB—5G gNB dual connectivity (EN-DC)", Feb. 2019 (available at https://www.eventhelix.com/5G/non-standalone-access-en-dc/en-dc-secondary-node-addition.pdf, visited Feb. 18, 2020).

* cited by examiner

SYSTEMS AND METHODS FOR ANCHOR SELECTION IN A NON-STANDALONE WIRELESS NETWORK ENVIRONMENT

CROSS-REFERENCE TO RELATED APPLICATION

This Application is a Continuation of U.S. patent application Ser. No. 16/822,059, filed on Mar. 18, 2020, titled "SYSTEMS AND METHODS FOR ANCHOR SELECTION IN A NON-STANDALONE WIRELESS NETWORK ENVIRONMENT," the contents of which are herein incorporated by reference in their entirety.

BACKGROUND

Wireless network providers may utilize radio access networks ("RANs") that implement different radio access technologies ("RATs"), such as Long-Term Evolution ("LTE") RATs, Fifth Generation ("5G") or New Radio ("NR") RATs, and/or other RATs. One example arrangement of RANs that may be implemented by a wireless network provider may include a Non-Standalone ("NSA") arrangement, in which portions of a 5G RAN may be correlated to portions of a LTE RAN. A User Equipment ("UE"), such as a mobile telephone, may be "anchored" to a portion of the LTE RAN, and may access correlated portions of the 5G RAN based on timing information, carrier (e.g., radio frequency ("RF")) band) information, etc. provided by the LTE RAN to which the UE is anchored.

DETAILED DESCRIPTION OF THE PREFERRED EMBODIMENTS

The following detailed description refers to the accompanying drawings. The same reference numbers in different drawings may identify the same or similar elements.

In a wireless network that implements a NSA architecture, embodiments described herein provide for the intelligent and automated selection of one or more suitable LTE base stations (e.g., eNBs) to serve as anchors for a 5G and/or New Radio ("NR") (referred to herein simply as "5G") base station (e.g., a gNB). As described herein, anchors may be identified on a gNB basis, or on a DU basis, where a gNB may be associated with multiple DUs. Generally speaking, a DU may include one or more antennas that provide wireless connectivity according to a 5G RAT, and multiple DUs may be geographically distributed. While described below in the context of anchors being selected "for a gNB," in practice, similar concepts may apply in the context of selecting one or more anchors for a DU.

The techniques described herein may provide for an automated selection of anchors for a set of gNBs, which may yield more reliable or suitable associations between eNBs and gNBs than a manual process, and which may further eliminate the need for a manual selection of anchor eNBs for gNBs. Further, techniques described herein may provide for the ongoing refinement of designations of certain eNBs as anchors for gNBs based on real-time data, thus allowing for the network to evolve dynamically based on ever-changing network conditions or usage.

Figure 1:
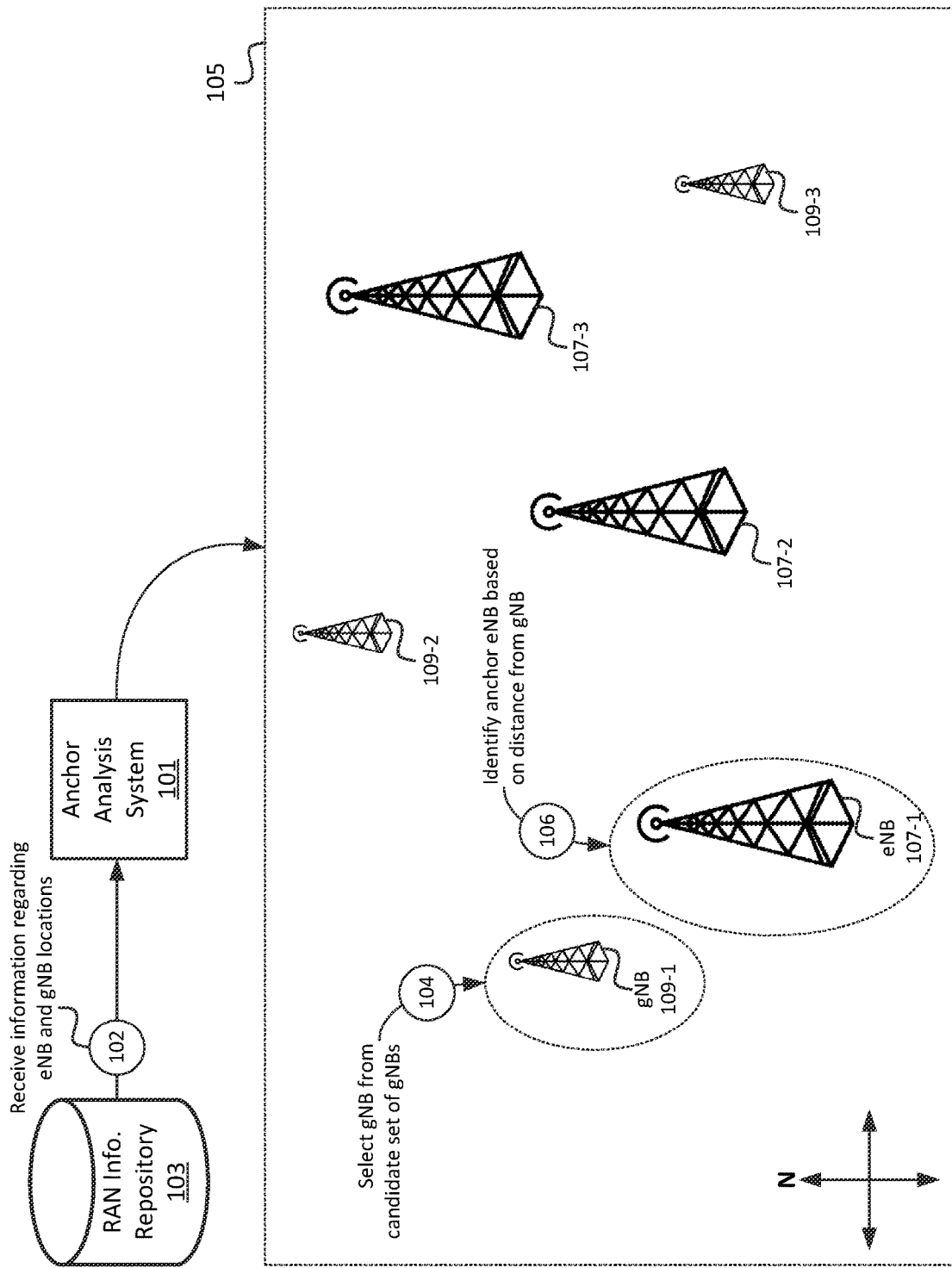
FIG. 1 illustrates an example selection of an anchor LTE evolved Node B ("eNB") for a given 5G Next Generation Node B ("gNB"), or a Distributed Unit ("DU") associated with the gNB, based on distance between a set of candidate eNBs and the gNB or the DU, in accordance with some embodiments.

As shown in FIG. 1, for example, Anchor Analysis System 101 may receive (at 102) information regarding geographic locations associated with a plurality of eNBs and a plurality of gNBs. The information indicating locations of gNBs may indicate locations of individual DUs associated with gNBs. Thus, the location information associated with one particular gNB may indicate multiple geographic locations of multiple DUs associated with the particular gNB. As mentioned above, examples herein are discussed in the context of gNBs; however, similar concepts may apply to individual DUs.

In FIG. 1, the location information is represented as an overhead map 105, with visual depictions of eNBs 107 and gNBs 109. In practice, the location information may be received as sets of coordinates that correspond to eNBs 107 and gNBs 109, and/or in some other suitable manner that indicates the geographical locations of eNBs 107 and gNBs 109. As shown, eNBs 107-1, 107-2, and 107-3 (which may be collectively referred to herein as "eNBs 107" or individually as "eNB 107") and gNBs 109-1, 109-2, and 109-3 (which may be collectively referred to herein as "gNBs 109" or individually as "gNB 109") may be located in the geographical region represented by map 105.

RAN information repository 103 may be, for example, a device or system that is included in, or is communicatively coupled to, a LTE core network that is communicatively coupled to eNBs 107. In some embodiments, RAN information repository 103 may be a device or system that is included in, or is communicatively coupled to, a 5G core network that is communicatively coupled to gNBs 109. For example, RAN information repository 103 may be implemented by, or communicatively coupled to, a Mobility Management Entity ("MME") associated with the LTE core network and/or an Access and Mobility Management Function ("AMF") associated with the 5G core network. Additionally, or alternatively, RAN information repository 103 may be a device or system that is "external" to the LTE core network and the 5G core network, and may be accessible via one or more other networks, such as the Internet.

Anchor Analysis System 101 may select (at 104) a particular gNB (i.e., gNB 109-1, in this example) to associate with an eNB 107, such that the selected eNB 107 may act as an anchor for gNB 109-1. As mentioned above, when a particular eNB 107 acts an anchor for a particular gNB 109, the particular eNB 107 may provide timing information, carrier information, and/or other suitable information that facilitates the connection of a UE (e.g., a dual-mode, dual-connectivity ("DC"), multi-mode, etc. UE, which is capable of wirelessly communicating with eNBs 107 and gNBs 109) with gNB 109. The selection (at 104) of gNB 109-1 may be based on identifying that gNB 109-1 is not currently associated with an anchor eNB 107. In some embodiments, the selection of gNB 109-1 may be performed even if gNB 109-1 is already associated with an anchor eNB 107. For example, an anchor for gNB 109-1 may be reassigned to another eNB 107. For example, as discussed below Anchor Analysis System 101 may identify performance metrics, load metrics, and/or other factors based on which Anchor Analysis System 101 may determine that a current anchor for gNB 109-1 should be changed.

In accordance with some embodiments, Anchor Analysis System 101 may identify (at 106) an anchor eNB 107 (i.e., eNB 107-1 in this example) to serve as an anchor for gNB 109-1. This determination may be made based on a geospatial analysis of the locations of gNB 109-1 and eNB 107-1. For example, the geospatial analysis may include a distance between gNB 109-1 and eNB 107-1. For example, Anchor Analysis System 101 may determine that the distance between gNB 109-1 and eNB 107-1 is the shortest distance between gNB 109-1 and any of the eNBs 107 for which Anchor Analysis System 101 has received (at 102) location information.

In some embodiments, the geospatial analysis may be performed based on a two-dimensional distance. For example, the geospatial analysis may be based on a distance that is based on latitude and longitude coordinates associated with gNB 109-1 and one or more eNBs 107. In some embodiments, the geospatial analysis may be performed based on a three-dimensional distance. For example, the geospatial analysis may be based on latitude and longitude coordinates and elevation, altitude, etc., associated with gNB 109-1 and one or more eNBs 107.

In some embodiments, Anchor Analysis System 101 may receive or maintain topographical or landmark information associated with the region represented by map 105, which may indicate physical features of the region. For example, the topographical or landmark information may indicate the presence of mountains, valleys, roads, buildings, billboards, and/or other topographical features or landmarks. Anchor Analysis System 101 may use such information when selecting a particular eNB 107 to act as an anchor for a given gNB 109. For example, if a first eNB 107 is geographically closer to a given gNB 109 than a second eNB 107, but a building is situated in between the given gNB 109 and the first eNB 107 (and no buildings are situated between the given gNB 109 and the second eNB 107), Anchor Analysis System 101 may select the second eNB 107 in this instance.

Figure 2:
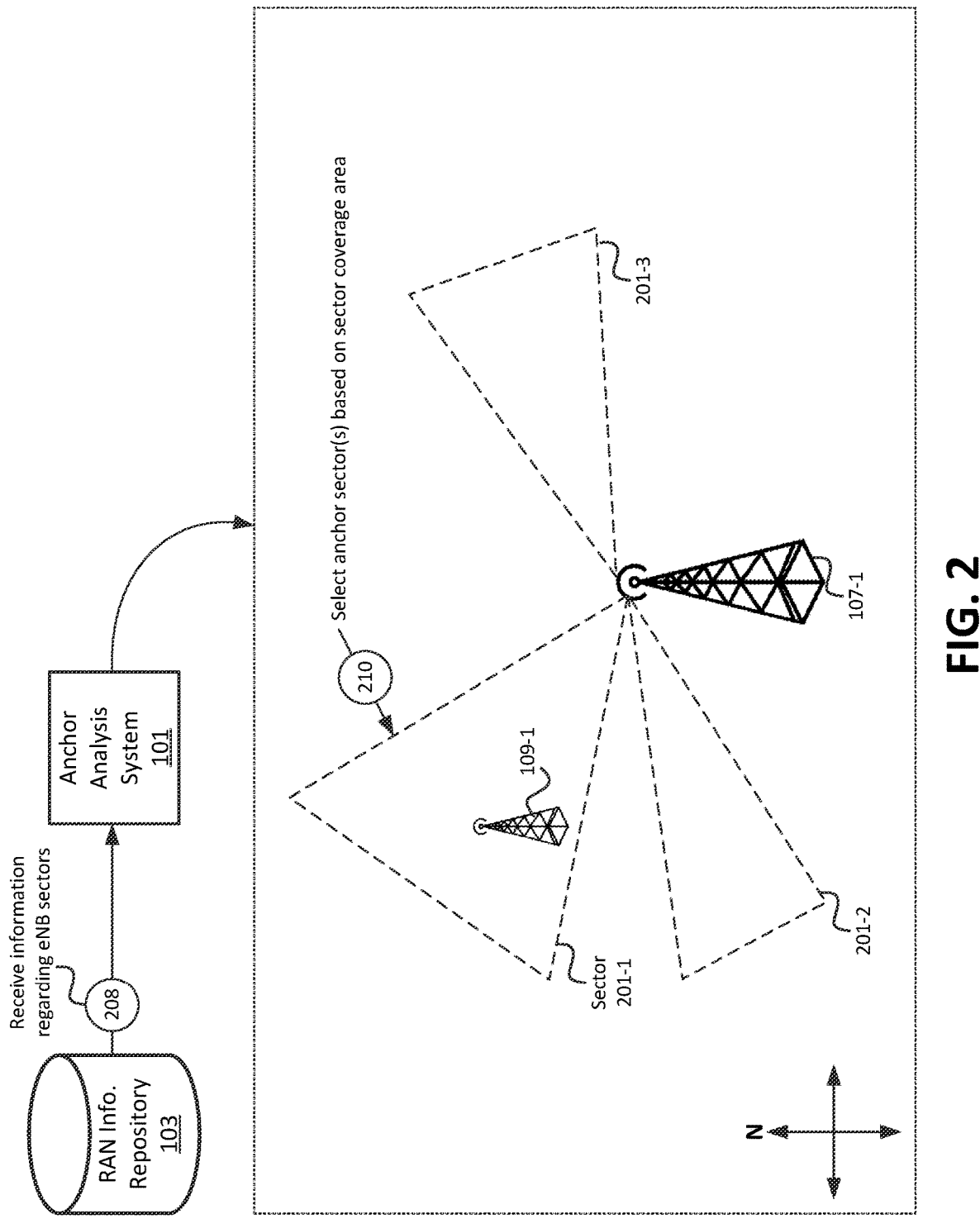
FIG. 2 illustrates an example selection of one or more sectors of a selected eNB to associate with the gNB or the DU, in accordance with some embodiments.

Referring to FIG. 2, and continuing with the example shown in FIG. 1, once Anchor Analysis System 101 has selected eNB 107-1 to act as an anchor for gNB 109-1, Anchor Analysis System 101 may obtain or receive (at 208) information regarding sectors implemented by eNB 107-1. For example, Anchor Analysis System 101 may request sector information associated with eNB 107-1 from RAN information repository 103. This request may include an identifier of eNB 107-1, such as an eNB identifier ("eNB-ID") and/or some other suitable identifier. In some embodiments, Anchor Analysis System 101 may have received sector information associated with eNB 107-1 and/or one or more other eNBs 107 prior to selecting (at 106) eNB 107-1. For example, Anchor Analysis System 101 may maintain some or all of the information stored by RAN information repository 103, and may use this maintained information to identify sector information associated with eNB 107-1 once eNB 107-1 is selected (at 106) as an anchor for gNB 109-1.

As referred to herein, a "sector" may be associated with a physical antenna, or a set of physical antennas, associated with a particular eNB 107. That is, eNBs 107 may include multiple sets of physical antennas that each implement a particular sector. Each sector may be associated with an azimuth angle, beam width, and a transmit power, which may generally define a coverage area associated with the sector. As discussed herein, each sector may be associated with a discrete set of carriers (e.g., bands or sub-bands of the RF spectrum), which may be indicated in the information provided (at 208) to Anchor Analysis System 101. In some embodiments, a carrier that is used in one sector associated with a particular eNB 107 may be associated with only that sector, and not other sectors associated with the same particular eNB 107.

The sector information, received from RAN information repository 103, may identify an azimuth angle, beam width, and/or transmit power associated with one or more sectors associated with eNB 107-1. For example, as shown in FIG. 2, eNB 107-1 may be associated with sectors 201-1, 201-2, and 201-3, for which three different sets of sector information may be received from RAN information repository 103. In some embodiments, the sector information for a given sector 201 may be provided as an indication of a geographical region that is associated with sector 201. For example, the sector information may be defined as a shape or polygon, with vertices that are defined in terms of coordinates (e.g., latitude and longitude) and/or in some other suitable manner.

Anchor Analysis System 101 may select (at 210) one or more sectors 201 of eNB 107 to act as an anchor for gNB 109-1. That is, based on this selection, one or more sectors 201 of eNB 107 may act as an anchor for gNB 109-1, while one or more other non-selected sectors 201 may not act as anchors for gNB 109-1. For example, the selection may be based on identifying which sector(s) 201 associated with eNB 107-1 have coverage areas in which gNB 109-1 is located. For example, as shown in FIG. 2, Anchor Analysis System 101 may determine that gNB 109-1 is located within a coverage area of sector 201-1, and may thus select sector 201-1 as an anchor sector for gNB 109-1 based on this determination.

In some embodiments, Anchor Analysis System 101 may select multiple sectors 201 as anchors for gNB 109-1. For example, Anchor Analysis System 101 may perform a geospatial analysis to determine information regarding gNB 109-1 and the various sectors. Based on this geospatial analysis, Anchor Analysis System 101 may determine that gNB 109-1 is within a threshold distance (e.g., based on a two-dimensional distance, a three-dimensional distance, etc.) of a coverage area associated with sector 201-2, and may further select sector 201-2 based on this determination. As yet another example, Anchor Analysis System 101 may identify that an azimuth angle associated with sector 201-2 is within a threshold difference of an angle between eNB 107-1 and gNB 109-1. In other words, Anchor Analysis System 101 may identify that a direction, at which a set of antennas associated with sector 201-2 is pointed, is the same or a similar direction as the location of gNB 109-1 from eNB 107-1. For example, assume that the threshold difference is 90 degrees. Further assume that gNB 109-1 is 80 degrees west of north from eNB 107-1, and that the set of antennas associated with sector 201-2 is pointed 115 degrees west of north from eNB 107-1. The difference between these angles is thus 35 degrees, which is within the example 90-degree threshold. Accordingly, in some embodiments, Anchor Analysis System 101 may additionally select sector 201-2 as an anchor sector for gNB 109-1. As further shown here, Anchor Analysis System 101 may not select sector 201-3 as an anchor for gNB 109-1, as gNB 109-1 is not located within a coverage area of sector 201-3, and a set of antennas that implement sector 201-3 are not pointed in the same general direction as gNB 109-1.

Figure 3:
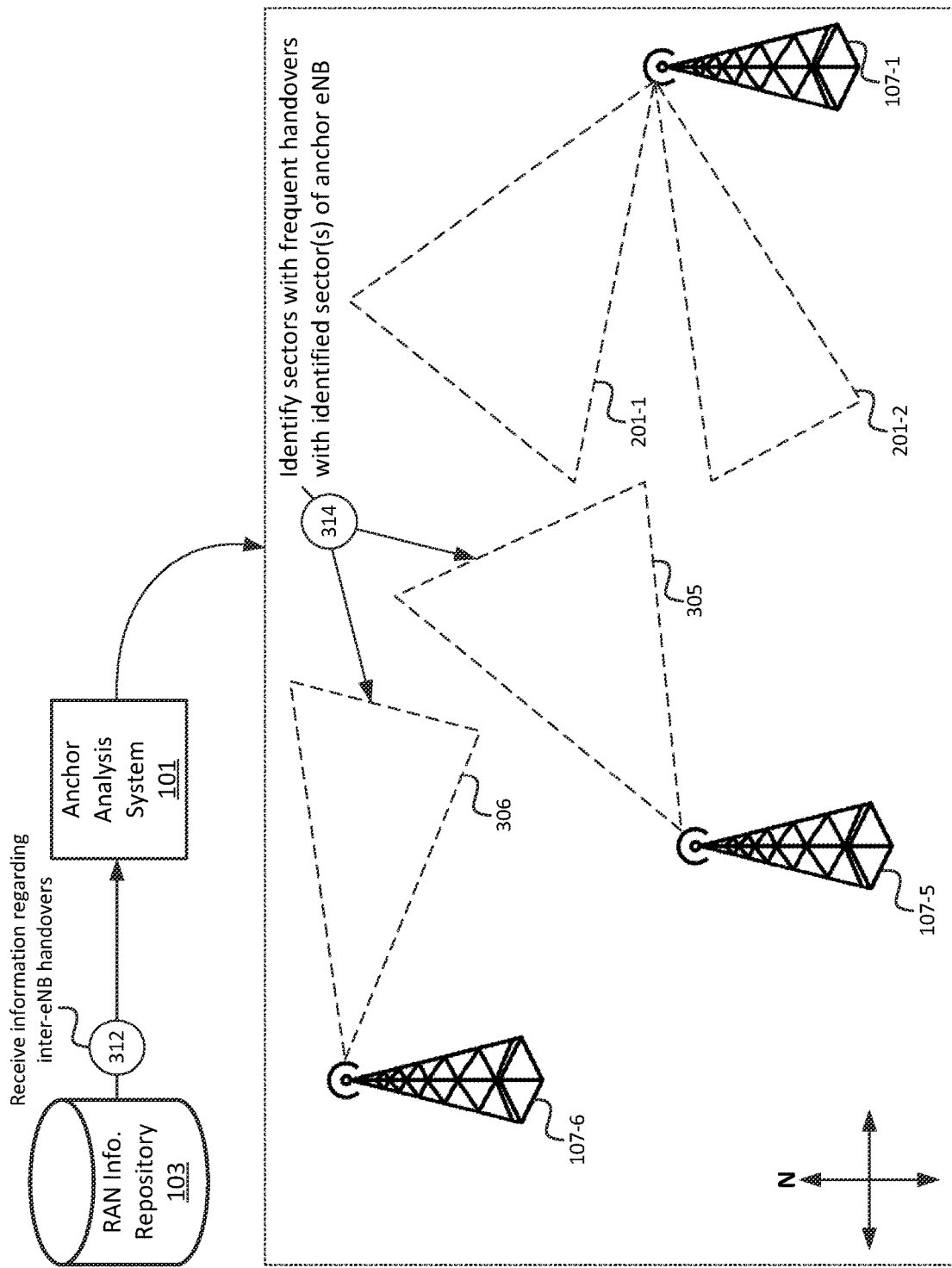
FIG. 3 illustrates an example selection of one or more additional sectors of one or more neighboring eNBs to associate with the gNB or the DU, in accordance with some embodiments.

Once the anchor sectors have been selected (at 210), Anchor Analysis System 101 may, as shown in FIG. 3, receive (at 312) historical information regarding inter-eNB handovers associated with these selected anchor sectors. The historical handover information may, for example, indicate handovers of UEs that have occurred between eNB 107-1 and one or more other eNBs 107. In this example, eNBs 107-5 and 107-6 are geographically proximate to eNB 107-1, and may thus participate in a relatively large proportion of the handovers that occur with respect to eNB 107-1. A handover between eNB 107-1 and eNB 107-5 may occur when, for example, a UE moves from a coverage area associated with eNB 107-1 to a coverage area associated with eNB 107-5, or vice versa.

Figure 4:
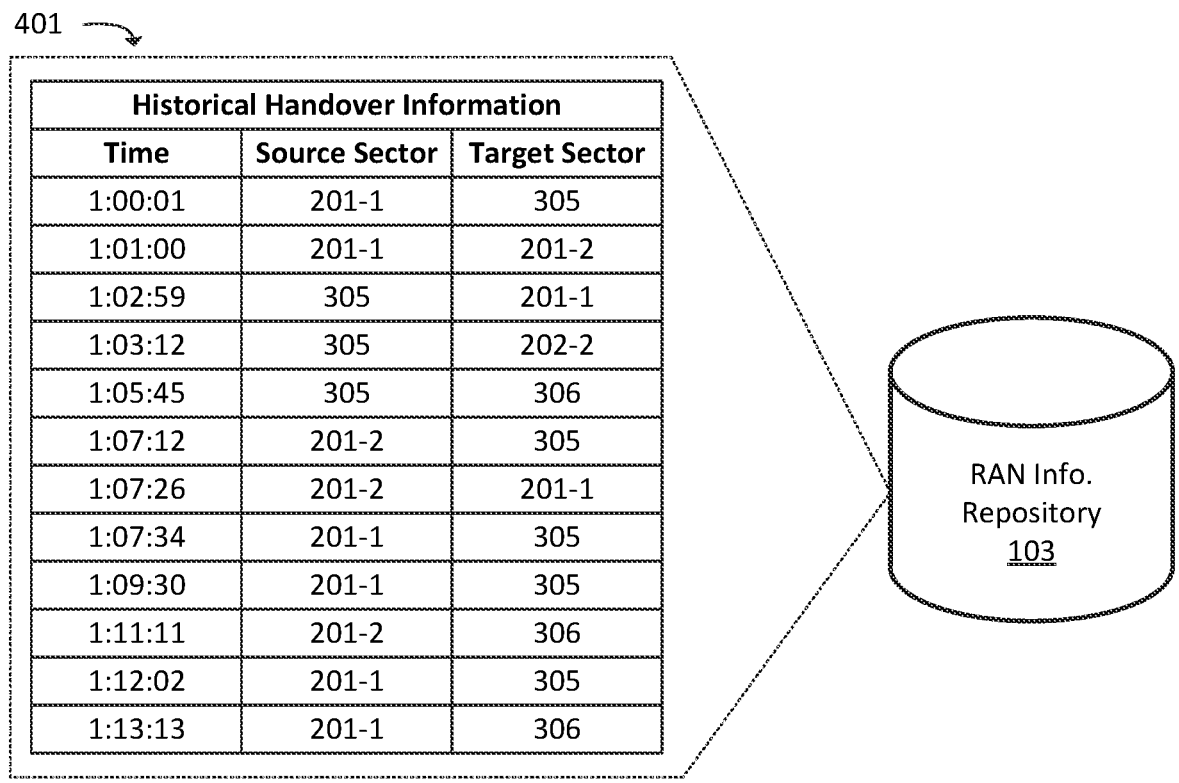
FIG. 4 illustrates an example record of historical handovers between the selected eNB and one or more additional eNBs, which may be used in accordance with some embodiments to select one or more additional sectors of the one or more additional eNBs to associate with the gNB or the DU.

FIG. 4 illustrates an exemplary data structure 401 for handover information being presented by RAN information repository 103 and/or analyzed by Anchor Analysis System 101. For example, as shown, data structure 401 may indicate times at which handovers occurred between eNBs, a source sector (e.g., a sector from which a UE was handed over), and a target sector (e.g., a sector to which the UE was handed over). While data structure 401 may include handover information regarding eNBs that are not shown in FIG. 3, for the sake of explanation, only handovers involving eNBs 107-1, 107-5, and 107-6 are indicated in this example. Referring to FIG. 3, eNB 107-5 may be associated with sector 305, and eNB 107-6 may be associated with sector 306. These eNBs may be associated with other sectors, but for the sake of brevity, only sectors 305 and 306 are discussed here.

As shown in FIG. 4, the historical handover information may indicate a relatively large number of handovers involving sector 201-1 and/or sector 201-2 (e.g., sectors identified (at 210) as anchor sectors) and sector 305. Additionally, the historical handover information may indicate a relatively large number of handovers involving sector 201-1 and/or sector 201-2 and sector 306.

In some embodiments, Anchor Analysis System 101 may determine that the quantity of handovers in a given time period, involving an anchor sector (e.g., sector 201-1 and/or sector 201-2) and another sector (e.g., sector 305 and/or sector 306) exceeds a threshold quantity. Based on this determination, Anchor Analysis System 101 may thus determine that the other sector (e.g., sector 305 and/or sector 306) is a sector that is frequently involved in handovers with an anchor sector.

As such, returning to FIG. 3, Anchor Analysis System 101 may identify (at 314) sectors with frequent handovers with identified anchor sectors. In this example, Anchor Analysis System 101 may identify that sectors 305 and 306 satisfy such criteria.

In some situations, Anchor Analysis System 101 may forgo identifying (at 314) additional sectors or eNBs to serve as an anchor for a given gNB 109. For example, if Anchor Analysis System 101 identifies, based on a geospatial analysis, that a particular eNB 107 is geospatially related to gNB 109 (e.g., is co-located with gNB 109, is located within a threshold distance of gNB 109, etc.), then Anchor Analysis System 101 may select some or all of the sectors associated with eNB 107, and may not identify sectors associated with other eNBs, which have participated in frequent handovers with eNB 107.

In some embodiments, thresholds or other criteria used in the identification of additional sectors or eNBs to serve as an anchor for a given gNB 109 may vary based on one or more factors. These factors may include a distance of gNB 109 from the location of eNB 107-1 (e.g., the eNB initially identified (at 106) as an anchor eNB). In some embodiments, another such factor may include a distance of gNB 109 from an edge of eNB 107-1 or an edge of sector 201-1 (e.g., a sector identified (at 210) as an anchor sector associated with the anchor eNB). In other words, the location of gNB 109, within the coverage area of eNB 107-1 or sector 201-1, may be a factor based on which additional sectors or eNBs may be identified. The coverage area associated with eNB 107-1, sector 201-1, sector 201-2, etc. may be determined based on measurements and/or performance metrics, and/or may be determined in some other suitable manner.

These factors may be used to dynamically determine a threshold handover frequency, between eNB 107-1 or sector 201-1, and one or more other eNBs or sectors. Generally speaking, if gNB 109 is co-located with eNB 107-1, or is relatively close to eNB 107-1, the threshold handover frequency may be higher. On the other hand, if gNB 109 is located relatively far away from eNB 107-1 (e.g., near an edge of a coverage area associated with eNB 107-1 or gNB 109), the threshold handover frequency may be lower.

In other words, referring to the example shown in FIG. 3, additional sector 305 may only be identified (at 314) if a relatively large quantity or frequency of handovers occur between eNB 107-1 and eNB 107-5 (e.g., involving UEs that connect to eNB 107-1 via sectors 201-1 or 201-2, and that connect to eNB 107-5 via sector 305) in situations where gNB 109 is located relatively close to eNB 107-1. On the other hand, and again referring to the example shown in FIG. 3, additional sector 305 may be identified (at 314) if at least a relatively lower quantity or frequency of handovers occur between eNB 107-1 and eNB 107-5 in situations where gNB 109 is located relatively far away from eNB 107-1.

In some embodiments, the handover threshold may be determined according to Formula 1:

$$T = (T_{max} - T_{min}) * e^{\char`\^}(-D*c) + T_{min} \quad \text{(Formula 1)}$$

In Formula 1, T represents a frequency threshold based on which a given sector may be identified (e.g., at 314) as an additional anchor sector, $T_{max}$ represents a maximum frequency threshold, $T_{min}$ represents a minimum frequency threshold, e represents a constant value (e.g., in some embodiments, Euler's number), D represents a distance of a given gNB 109 from an anchor eNB (e.g., eNB 107-1, referring to the above examples), and c represents a constant value (e.g., a value of 5 in some embodiments).

In some embodiments, T may be expressed as a percentage of handovers. That is, if 100 handovers occurred involving sector 201-1 and 40 of those handovers also involved sector 305 (e.g., handovers between sectors 201-1 and 305), then 40% of the total handovers involving sector 201-1 would be considered as involving sector 305. Thus, if T is 40% or below, then sector 305 would be selected (at 314) as an additional anchor sector, while if T is above 40%, then sector 305 may not be selected as an additional anchor sector.

In some embodiments, $T_{max}$ and $T_{min}$ may also be expressed as percentages of handovers. These values may reflect upper and lower bounds of the ultimate value of T. That is, $T_{max}$ may be a maximum possible value of T, and $T_{min}$ may be a minimum possible value of T. For example, if gNB 109 is co-located with eNB 107-1 (e.g., where D=0), T and $T_{max}$ may be identical. On the other hand, if gNB 109 is located relatively far away from eNB 107-1, then T and $T_{min}$ may be identical. The values for $T_{max}$ and $T_{min}$ may be set manually, and/or may be determined or adjusted using machine learning or other suitable techniques.

In some embodiments, the value D may be determined according to Formula 2:

$$D = D_{gNB}/D_{edge} \quad \text{(Formula 2)}$$

The value $D_{gNB}$ may be a distance of gNB 109 from eNB 107-1, and $D_{edge}$ may be a distance of an edge of the coverage area of eNB 107-1 (or an anchor sector of eNB 107-1, such as anchor 201-1 or 201-2) from eNB 107-1. Thus, when gNB 109 is co-located with eNB 107-1, D may be 0 (or a relatively small number), while when gNB 109 is near an edge of eNB 107-1, D may be 1 (or relatively close to 1).

In some embodiments, the distance between gNB 109 and additional eNB 107-5 may be a factor in determining whether to include eNB 107-5 as an anchor for gNB 109. For example, the handover threshold may be lowered based on gNB 109 being relatively closer to eNB 107-5, while the handover threshold may be increased based on gNB 109 being relatively farther away from eNB 107-5.

Figure 5:
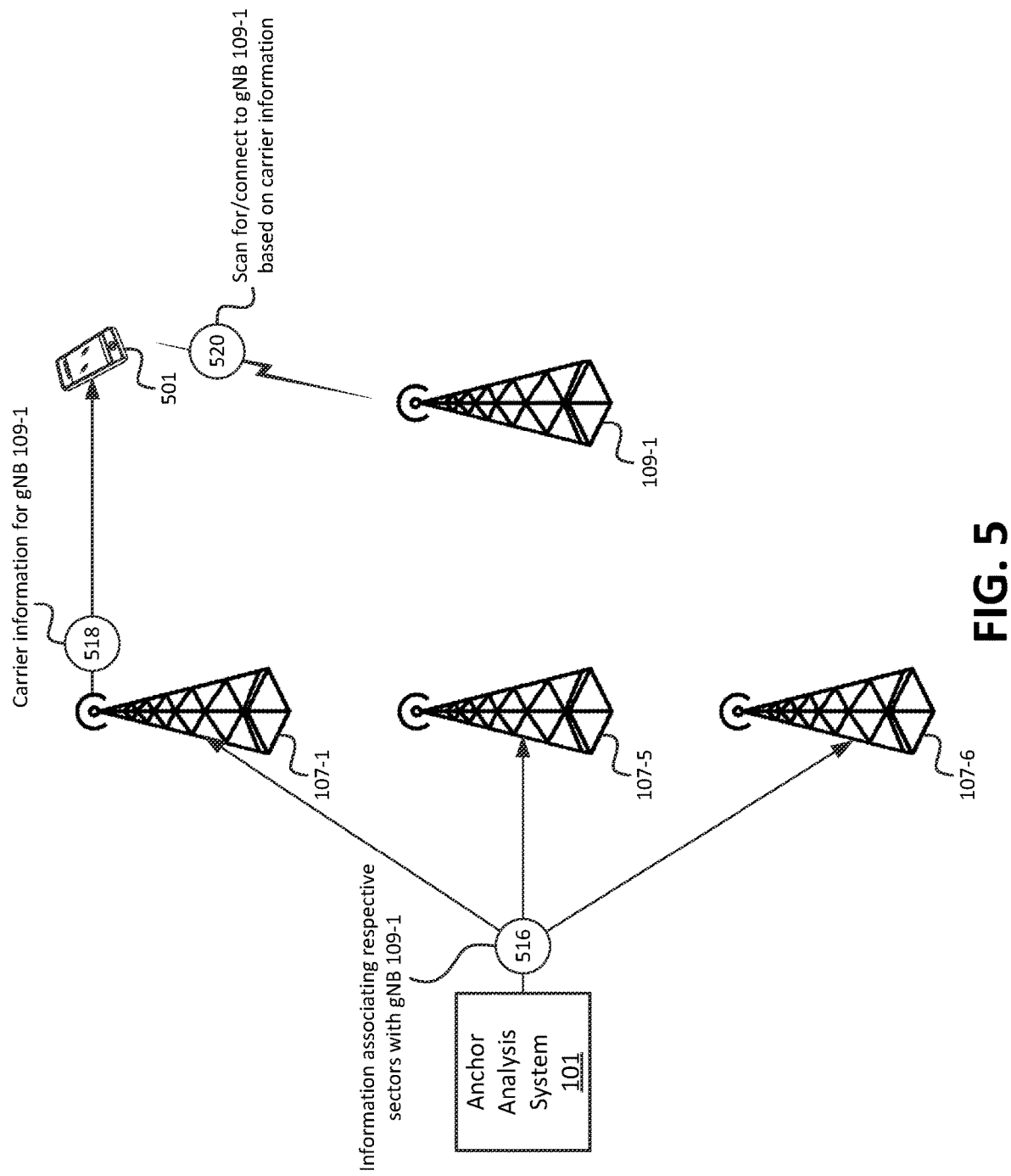
FIG. 5 illustrates an example establishment of one or more eNBs as anchors for a given gNB or DU, in accordance with some embodiments.

Once Anchor Analysis System 101 has selected (at 210 and/or 314) anchor sectors for gNB 109-1, Anchor Analysis System 101 may, as shown in FIG. 5, provide (at 516) information associating these sectors to eNBs 107-1, 107-5, and 107-6 (e.g., the eNBs that implement these selected sectors). In some embodiments, Anchor Analysis System 101 may only provide each eNB 107 with information regarding sector(s) implemented by that respective eNB 107. For example, Anchor Analysis System 101 may notify eNB 107-1 that sectors 201-1 and 201-2 are anchor sectors for gNB 109-1, may notify eNB 107-5 that sector 305 is an anchor sector for gNB 109-1, and may notify eNB 107-6 that sector 306 is an anchor sector for gNB 109-1. Additionally, or alternatively, Anchor Analysis System 101 may identify carriers associated with the selected sectors, and may notify eNBs 107 of the respective carriers to use as anchors for gNB 109-1.

In some embodiments, Anchor Analysis System 101 may also notify (at 516) eNBs 107-1, 107-5, and 107-6 of one or more carriers implemented by gNB 109-1. For example, Anchor Analysis System 101 may receive such information from RAN information repository 103 and/or some other source. In some embodiments, in lieu of receiving carrier information associated with gNB 109-1 from Anchor Analysis System 101, eNBs 107-1, 107-5, and 107-6 may receive such information from RAN information repository 103, from gNB 109-1 (e.g., via a respective X2 interface between gNB 109-1 and eNB 107-1, 107-5, and 107-6), and/or some other source. In this manner, eNB 107-1 may maintain information correlating a first set of carriers (e.g., carriers implemented by selected sectors 201-1 and 201-2) to a second set of carriers (e.g., carriers implemented by gNB 109-1). Similarly, eNB 107-2 may maintain information correlating carriers implemented by sector 305 to carriers implemented by gNB 109-1, and eNB 107-3 may maintain information correlating carriers implemented by sector 306 to carriers implemented by gNB 109-1.

ENB 107-1, eNB 107-5, and eNB 107-6 may use this correlation information to notify connected UEs of the presence of gNB 109-1, and/or to instruct such UEs to scan for and/or connect to gNB 109-1. For example, as shown, UE 501 may be connected to eNB 107-1. Furthermore, in this example, assume that UE 501 is connected to eNB 107-1 via one of the selected anchor sectors (i.e., sector 201-1 or 201-2). That is, UE 501 may be in communications with eNB 107-1 via a particular carrier (or carriers) associated with a particular anchor sector 201-1 or 201-2.

Based on identifying that UE 501 is connected to eNB 107-1 via a carrier associated with an anchor sector 201-1 or 201-2, eNB 107-1 may provide (at 518) carrier information, associated with gNB 109-1, to UE 501. For example, eNB 107-1 may provide such information during a connection establishment or modification process between UE 501 and eNB 107-1. ENB 107-1 may provide a Radio Resource Control ("RRC") Reconfiguration message, indicating the carriers associated with gNB 109-1, and instructing UE 501 to scan for these carriers. While shown as a single signal (518) in the figure, in practice, multiple messages may be passed between UE 501 and eNB 107-1 (e.g., UE capability information, indicating carriers or RATs supported by UE 501, and/or other messages). These messages are not discussed in detail here for the sake of brevity.

UE 501 may accordingly scan (at 520) for the carriers associated with gNB 109-1 and ultimately connect to gNB 109-1 using one or more of the carriers associated with gNB 109-1. Again, while this scanning and connection process is shown as one signal (520) between UE 501 and gNB 109-1, in practice, multiple messages (including, for example, measurement reports generated by UE 501 indicating signal strength or quality of the indicated carriers associated with gNB 109-1) may be passed between UE 501, gNB 109-1, and/or eNB 107-1 to effectuate the connection between UE 501 and gNB 109-1. Once connected, gNB 109-1 and UE 501 may communicate wirelessly. UE 501 may be considered as "camping on" eNB 107-1, while communicating wirelessly with gNB 109-1. For example, if UE 501 loses connectivity with gNB 109-1, eNB 107-1 and UE 501 may resume communications without performing a new connection establishment process.

In some embodiments, gNB 109-1 may provide uplink user plane traffic (e.g., traffic received wirelessly from UE 501) to eNB 107-1 (e.g., via an X2 interface), and eNB 107-1 may forward the traffic to a LTE core network associated with eNB 107-1. Similarly, in some embodiments, eNB 107-1 may provide downlink traffic for UE 501 to gNB 109-1, and gNB 109-1 may wirelessly forward the traffic to UE 501. In some embodiments, gNB 109-1 may communicate uplink and/or downlink user plane traffic, associated with UE 501, with elements of LTE core network (e.g., without the traffic traversing eNB 107-1). While FIG. 5 is described in the context of UE 501 connected to (or "camped on") eNB 107-1, similar concepts may apply to UEs that are connected to eNB 107-5 and/or eNB 107-6.

Figure 6:
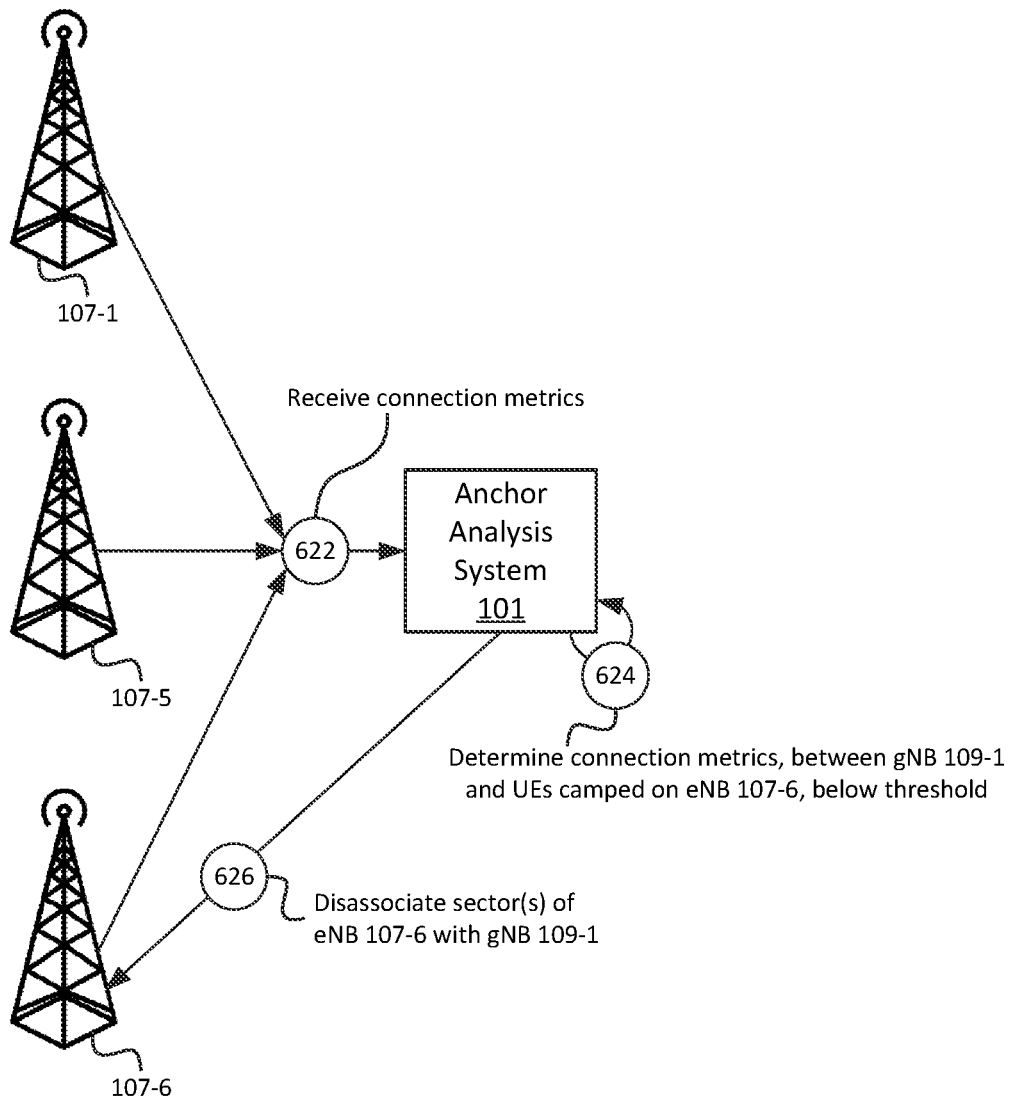
FIG. 6 illustrates an example refinement of the designation of anchor eNBs for a given gNB or DU, in accordance with some embodiments.

As mentioned above, conditions or metrics may be monitored, such that the assignment of eNBs or sectors as anchors for a given gNB 109 may be modified or refined. For example, as shown in FIG. 6, Anchor Analysis System 101 may receive (at 622) connection metrics associated with eNBs 107-1, 107-5, and/or 107-6. Anchor Analysis System 101 may receive these metrics from eNBs 107-1, 107-5, and/or 107-6, RAN information repository 103, and/or some other device or system that generates or maintains such metrics.

In some embodiments, the connection metrics may include information indicating a signal strength and/or quality (e.g., Received Signal Strength Indicator ("RSSI"), Signal-to-Interference-and-Noise-Ratio ("SINN")) between UEs and one or more gNBs for which eNBs 107-1, 107-5, and/or 107-6 have been designated as anchor eNBs (e.g., gNB 109-1, continuing with the above example). The signal strength or quality may be received via measurement reports generated or obtained by UEs when scanning (e.g., at 520) for gNB 109, or may reflect signal quality or strength between UEs and gNB 109 after the UEs have connected to gNB 109.

In some embodiments, the connection metrics may indicate a duration of time that UEs have been connected to gNB 109-1 when camped on eNB 107-1, 107-5, and/or 107-6. For example, relatively short durations of time may indicate that UEs briefly connected to gNB 109-1 before losing connectivity.

As another example, the connection metrics may indicate a quantity of times that a UE has received carrier information for gNB 109 and subsequently connected to gNB 109, and/or a quantity of times that a UE has received carrier information for gNB 109 and did not subsequently connect to gNB 109. These quantities may reflect, for example, that UEs may not have connected to gNB 109 due to relatively low measures of signal strength and/or quality.

In this example, Anchor Analysis System 101 may determine (at 624) that connection metrics, between gNB 109-1 and UEs camped on eNB 107-6 are below a threshold. For example, Anchor Analysis System 101 may determine that an average, median, mean, etc. signal quality or strength between such UEs and gNB 109-1 is below a threshold signal quality. As another example, Anchor Analysis System 101 may determine that an average, median, mean, etc. duration of connections between gNB 109-1 and UEs camped on eNB 107-6 is below a threshold duration.

Based on this determination (at 624), Anchor Analysis System 101 may output (at 626) a notification to disassociate the previously associated sectors of eNB 107-6 with gNB 109-1. That is, Anchor Analysis System 101 may notify eNB 107-6 that the previously designated anchor sector 306 should no longer be an anchor for gNB 109-1. Accordingly, eNB 107-6 may notify connected UEs (e.g., via RRC Reconfiguration Request messages) that carriers associated with gNB 109-1 are not available for connection, and/or may forgo notifying UEs of carriers associated with gNB 109-1 in the future. In this manner, the designation of eNBs (or sectors of eNBs) as anchors for gNBs may be refined in an ongoing manner, based on real world statistics.

Figure 7:
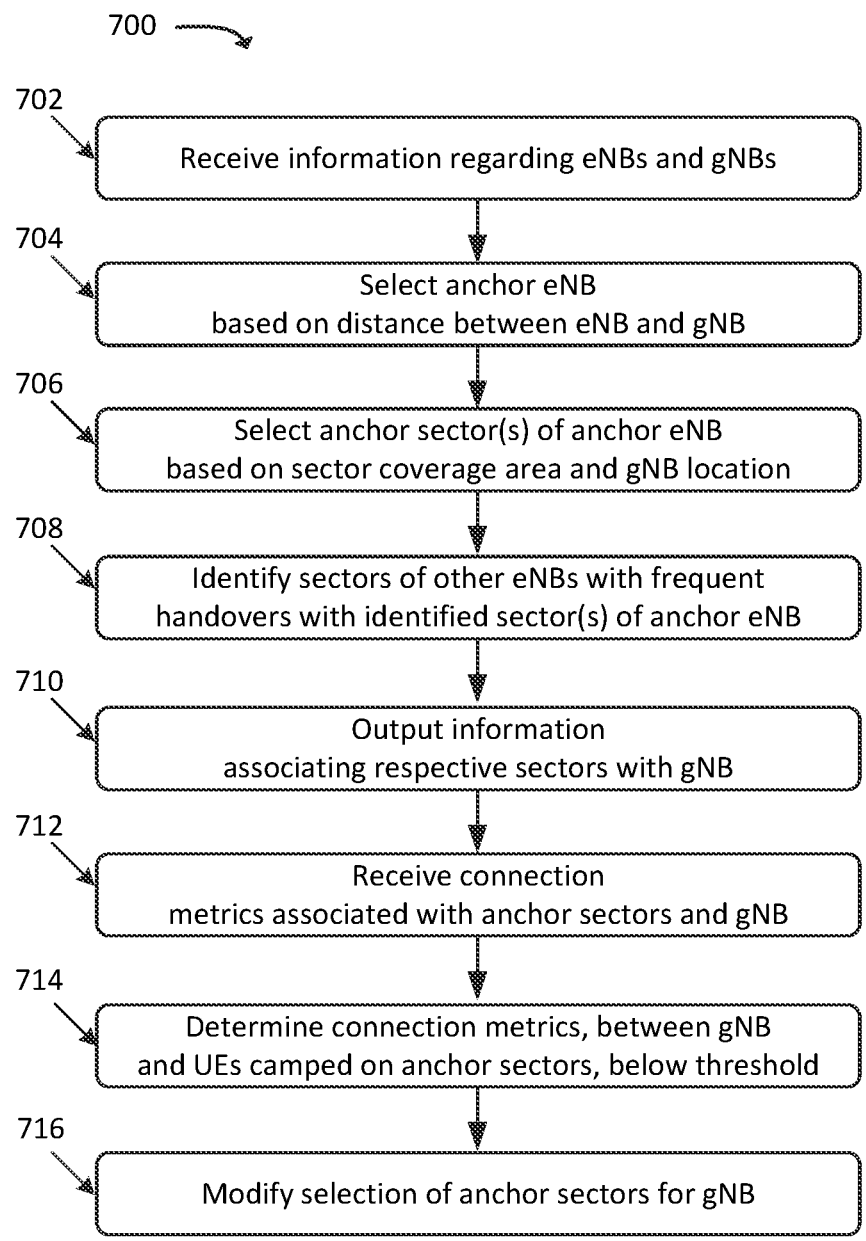
FIG. 7 illustrates an example process for selecting one or more eNBs, sectors, and/or carriers to serve as an anchor for a given gNB or DU, in accordance with some embodiments.

FIG. 7 illustrates an example process 700 for selecting one or more eNBs, sectors, and/or carriers to serve as an anchor for a given gNB, in accordance with some embodiments. In some embodiments, some or all of process 700 may be performed by Anchor Analysis System 101. In some embodiments, one or more other devices may perform some or all of process 700 (e.g., in concert with, and/or in lieu of, Anchor Analysis System 101).

As shown, process 700 may include receiving (at 702) information regarding a set of eNBs and gNBs. For example, as discussed above, Anchor Analysis System 101 may (e.g., from RAN information repository 103 and/or from some other source) receive geographical information associated with eNBs 107 and gNBs 109. Further, Anchor Analysis System 101 may receive information indicating carriers implemented by eNBs 107 and/or gNBs 109. As also discussed above, Anchor Analysis System 101 may receive information indicating coverage areas associated with sectors associated with eNBs 107, which may be defined by geographical bounds, may be defined by azimuth angle, beam width, and transmit power, and/or which may be defined in some other suitable manner.

Process 700 may further include selecting (at 704) an anchor eNB 107 based on distance between the set of eNBs 107 and a selected particular gNB 109. For example, Anchor Analysis System 101 may select a closest eNB 107 to the particular gNB 109. In some embodiments, Anchor Analysis System 101 may select all eNBs 107 within a threshold distance of gNB 109.

Process 700 may further include selecting (at 706) one or more anchor sectors of the selected anchor eNB(s) 107 based on coverage areas of sectors associated with the selected anchor eNB(s) 107, and the location of gNB 109. For example, as similarly discussed above, Anchor Analysis System 101 may identify sectors having coverage areas within which gNB 109 is located, and/or sectors implemented by antennas that are pointed in the same or similar direction as gNB 109.

Process 700 may additionally include identifying (at 708) sectors with other eNBs 107 with frequent handovers involving the identified anchor sector(s) of the anchor eNB (s) 107. For example, as discussed above, Anchor Analysis System 101 may identify sectors of neighboring eNBs 107, to which or from which handovers of UEs have occurred with a relatively high occurrence or frequency.

Process 700 may also include outputting (at 710) information associating the identified sectors with gNB 109. For example, Anchor Analysis System 101 may notify eNBs 107, that implement the identified sectors, that these sectors (and/or carriers associated with these sectors) are designated as an anchor for gNB 109. Accordingly, these eNBs 107 may notify (e.g., via RRC Reconfiguration Request messages and/or some other suitable type of message) UEs that are connected to these eNBs 107 that gNB 109 is available for connection, and may further provide carrier information associated with gNB 109. UEs may use this information to connect to, and perform subsequent user plane communications with, gNB 109.

Process 700 may further include receiving (at 712) connection metrics associated with the anchor sectors and gNB 109. As discussed above, these connection metrics may include signal quality or signal strength metrics between UEs camped on a particular anchor sector and gNB 109, durations of connections to gNB 109 by UEs camped on the particular anchor sector, etc.

Process 700 may additionally include determining (at 714) that the connection metrics, between gNB 109 and the UEs camped on anchor sectors, are below a threshold. For example, as discussed above, such metrics may be used to identify relatively weak or unstable connections between UEs camped on a particular anchor sector and gNB 109.

Process 700 may also include modifying (at 716) the selection of anchor sectors for gNB 109. For example, Anchor Analysis System 101 may determine that a particular eNB 107, or sector associated with eNB 107, should not be an anchor for gNB 109. Anchor Analysis System 101 may thus notify the identified eNB 107 that eNB 107 is not an anchor for gNB 109, and/or that one or more particular sectors of eNB 107 are not anchors for gNB 109.

Figure 8:
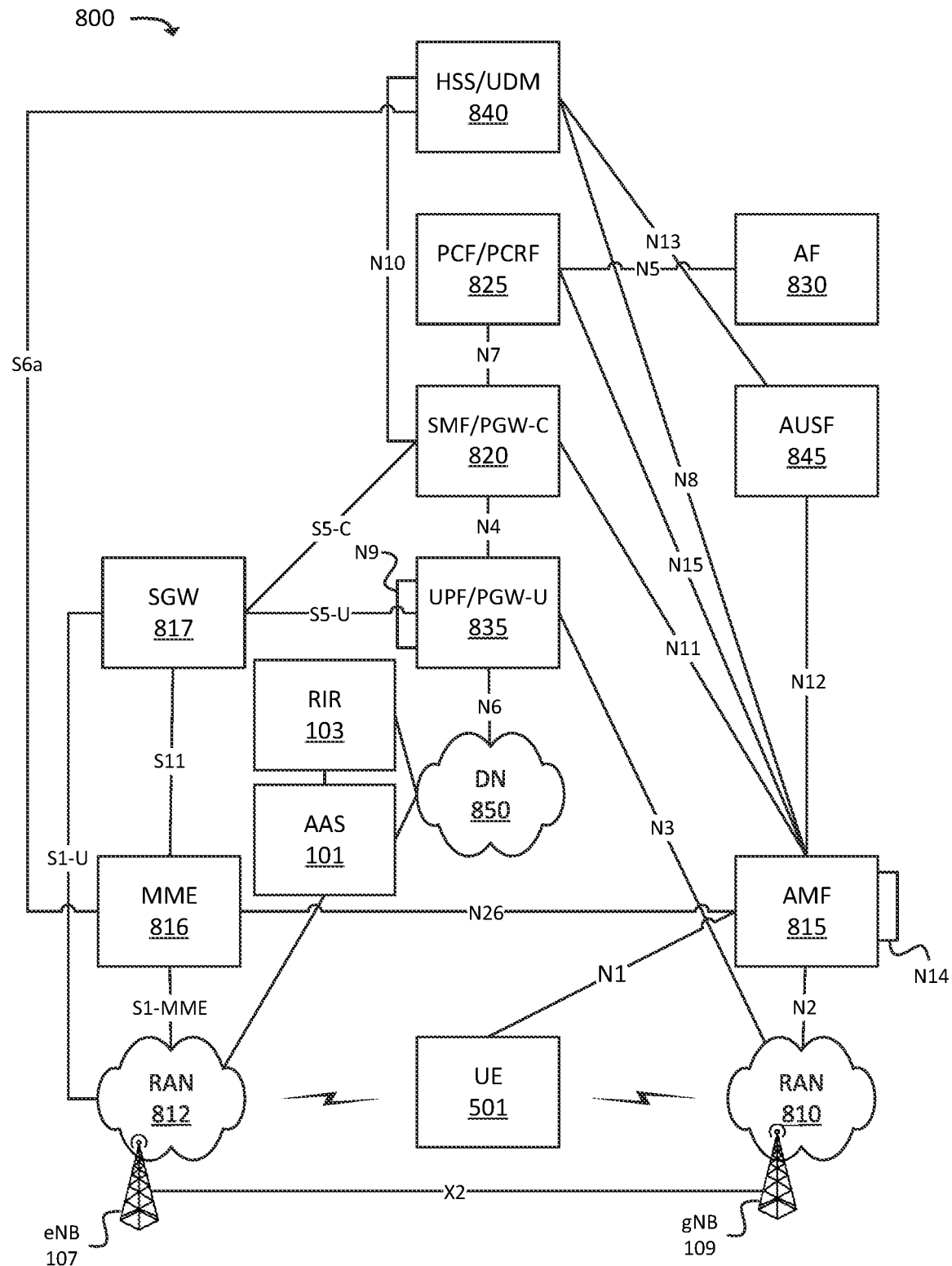
FIG. 8 illustrates an example environment in which one or more embodiments, described herein, may be implemented.

FIG. 8 illustrates an example environment 800, in which one or more embodiments may be implemented. In some embodiments, environment 800 may correspond to a 5G network, and/or may include elements of a 5G network. In some embodiments, environment 800 may correspond to a 5G NSA architecture, in which a 5G radio access technology RAT may be used in conjunction with one or more other RATs (e.g., a LTE RAT), and/or in which elements of a 5G core network may be implemented by, may be communicatively coupled with, and/or may include elements of another type of core network (e.g., an evolved packet core ("EPC")). As shown, environment 800 may include UE 501, RAN 810 (which may include one or more gNBs 109), RAN 812 (which may include one or more one or more eNBs 107), Access and Mobility Management Function ("AMF") 815, Session Management Function ("SMF")/Packet Data Network ("PDN") Gateway ("PGW")-Control plane function ("PGW-C") 820, Policy Control Function ("PCF")/Policy Charging and Rules Function ("PCRF") 825, Application Function ("AF") 830, User Plane Function ("UPF")/PGW-User plane function ("PGW-U") 835, Home Subscriber Server ("HSS")/Unified Data Management ("UDM") 840, Authentication Server Function ("AUSF") 845, Data Network ("DN") 850, Anchor Analysis System 101, and RAN information repository 103.

The quantity of devices and/or networks, illustrated in FIG. 8, is provided for explanatory purposes only. In practice, environment 800 may include additional devices and/or networks, fewer devices and/or networks, different devices and/or networks, or differently arranged devices and/or networks than illustrated in FIG. 8. For example, while not shown, environment 800 may include devices that facilitate or enable communication between various components shown in environment 800, such as routers, modems, gateways, switches, hubs, etc. Alternatively, or additionally, one or more of the devices of environment 800 may perform one or more functions described as being performed by another one or more of the devices of environment 800. Devices of environment 800 may interconnect with each other and/or other devices via wired connections, wireless connections, or a combination of wired and wireless connections. In some implementations, one or more devices of environment 800 may be physically integrated in, and/or may be physically attached to, one or more other devices of environment 800.

UE 501 may include a computation and communication device, such as a wireless mobile communication device that is capable of communicating with RAN 810 and/or DN 850. UE 501 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, a Mobile-to-Mobile ("M2M") device, or another type of mobile computation and communication device. UE 501 may send traffic to and/or receive traffic (e.g., user plane traffic) from DN 850 via RAN 810 and UPF/PGW-U 835.

RAN 810 may be, or may include, a 5G RAN that includes one or more base stations (e.g., one or more gNBs 109), via which UE 501 may communicate with one or more other elements of environment 800. UE 501 may communicate with RAN 810 via an air interface (e.g., as provided by gNB 109). For instance, RAN 810 may receive traffic (e.g., voice call traffic, data traffic, messaging traffic, signaling traffic, etc.) from UE 501 via the air interface, and may communicate the traffic to UPF/PGW-U 835, and/or one or more other devices or networks. Similarly, RAN 810 may receive traffic intended for UE 501 (e.g., from UPF/PGW-U 835, AMF 815, and/or one or more other devices or networks) and may communicate the traffic to UE 501 via the air interface.

RAN 812 may be, or may include, an LTE RAN that includes one or more base stations (e.g., one or more eNBs 107), via which UE 501 may communicate with one or more other elements of environment 800. UE 501 may communicate with RAN 812 via an air interface (e.g., as provided by eNB 107). For instance, RAN 810 may receive traffic (e.g., voice call traffic, data traffic, messaging traffic, signaling traffic, etc.) from UE 501 via the air interface, and may communicate the traffic to UPF/PGW-U 835, and/or one or more other devices or networks. Similarly, RAN 810 may receive traffic intended for UE 501 (e.g., from UPF/PGW-U 835, SGW 517, and/or one or more other devices or networks) and may communicate the traffic to UE 501 via the air interface.

AMF 815 may include one or more devices, systems, Virtualized Network Functions ("VNFs"), etc., that perform operations to register UE 501 with the 5G network, to establish bearer channels associated with a session with UE 501, to hand off UE 501 from the 5G network to another network, to hand off UE 501 from the other network to the 5G network, and/or to perform other operations. In some embodiments, the 5G network may include multiple AMFs 815, which communicate with each other via the N14 interface (denoted in FIG. 8 by the line marked "N14" originating and terminating at AMF 815).

SGW 517 may include one or more devices, systems, VNFs, etc., that aggregate traffic received from one or more eNBs 107 and send the aggregated traffic to an external network or device via UPF/PGW-U 835. Additionally, SGW 517 may aggregate traffic received from one or more UPF/PGW-Us 835 and may send the aggregated traffic to one or more eNBs 107. SGW 517 may operate as an anchor for the user plane during inter-eNB handovers and as an anchor for mobility between different telecommunication networks or RANs (e.g., RANs 810 and 812).

SMF/PGW-C 820 may include one or more devices, systems, VNFs, etc., that gather, process, store, and/or provide information in a manner described herein. SMF/PGW-C 820 may, for example, facilitate in the establishment of communication sessions on behalf of UE 501. In some embodiments, the establishment of communications sessions may be performed in accordance with one or more policies provided by PCF/PCRF 825.

PCF/PCRF 825 may include one or more devices, systems, VNFs, etc., that aggregate information to and from the 5G network and/or other sources. PCF/PCRF 825 may receive information regarding policies and/or subscriptions from one or more sources, such as subscriber databases and/or from one or more users (such as, for example, an administrator associated with PCF/PCRF 825).

AF 830 may include one or more devices, systems, VNFs, etc., that receive, store, and/or provide information that may be used in determining parameters (e.g., quality of service parameters, charging parameters, or the like) for certain applications.

UPF/PGW-U 835 may include one or more devices, systems, VNFs, etc., that receive, store, and/or provide data (e.g., user plane data). For example, UPF/PGW-U 835 may receive user plane data (e.g., voice call traffic, data traffic, etc.), destined for UE 501, from DN 850, and may forward the user plane data toward UE 501 (e.g., via RAN 810, SMF/PGW-C 820, and/or one or more other devices). In some embodiments, multiple UPFs 835 may be deployed (e.g., in different geographical locations), and the delivery of content to UE 501 may be coordinated via the N9 interface (e.g., as denoted in FIG. 8 by the line marked "N9" originating and terminating at UPF/PGW-U 835). Similarly, UPF/PGW-U 835 may receive traffic from UE 501 (e.g., via RAN 810, SMF/PGW-C 820, and/or one or more other devices), and may forward the traffic toward DN 850. In some embodiments, UPF/PGW-U 835 may communicate (e.g., via the N4 interface) with SMF/PGW-C 820, regarding user plane data processed by UPF/PGW-U 835.

HSS/UDM 840 and AUSF 845 may include one or more devices, systems, VNFs, etc., that manage, update, and/or store, in one or more memory devices associated with AUSF 845 and/or HSS/UDM 840, profile information associated with a subscriber. AUSF 845 and/or HSS/UDM 840 may perform authentication, authorization, and/or accounting operations associated with the subscriber and/or a communication session with UE 501.

DN 850 may include one or more wired and/or wireless networks. For example, DN 850 may include an Internet Protocol ("IP")-based PDN, a wide area network ("WAN") such as the Internet, a private enterprise network, and/or one or more other networks. UE 501 may communicate, through DN 850, with data servers, other UEs 501, and/or to other servers or applications that are coupled to DN 850. DN 850 may be connected to one or more other networks, such as a public switched telephone network ("PSTN"), a public land mobile network ("PLMN"), and/or another network. DN 850 may be connected to one or more devices, such as content providers, applications, web servers, and/or other devices, with which UE 501 may communicate.

RAN information repository 103 may include one or more devices, systems, VNFs, etc., that receive, maintain, and/or provide information regarding eNBs 107 and/or gNBs 109. RAN information repository 103 may receive such information from eNBs 107 and/or gNBs 109 (e.g., via a direct connection), from AMF 815, MME 815, and/or some other source. In some embodiments, RAN information repository 103 may receive the information via DN 850 and/or some other network.

Anchor Analysis System 101 may include one or more devices, systems, VNFs, etc., that identify anchors for a particular gNB (e.g., based on information received from RAN information repository 103), in a manner described above. Anchor Analysis System 101 may be communicatively coupled to one or more eNBs 107, to RAN information repository 103, and/or to one or more other devices or networks (e.g., DN 850). In some embodiments, Anchor Analysis System 101 may be communicatively coupled to one or more other devices or systems, such as one or more of the devices, systems, VNFs, etc. shown in FIG. 8. For the purposes of explanation, these connections are not shown in the figure.

Figure 9:
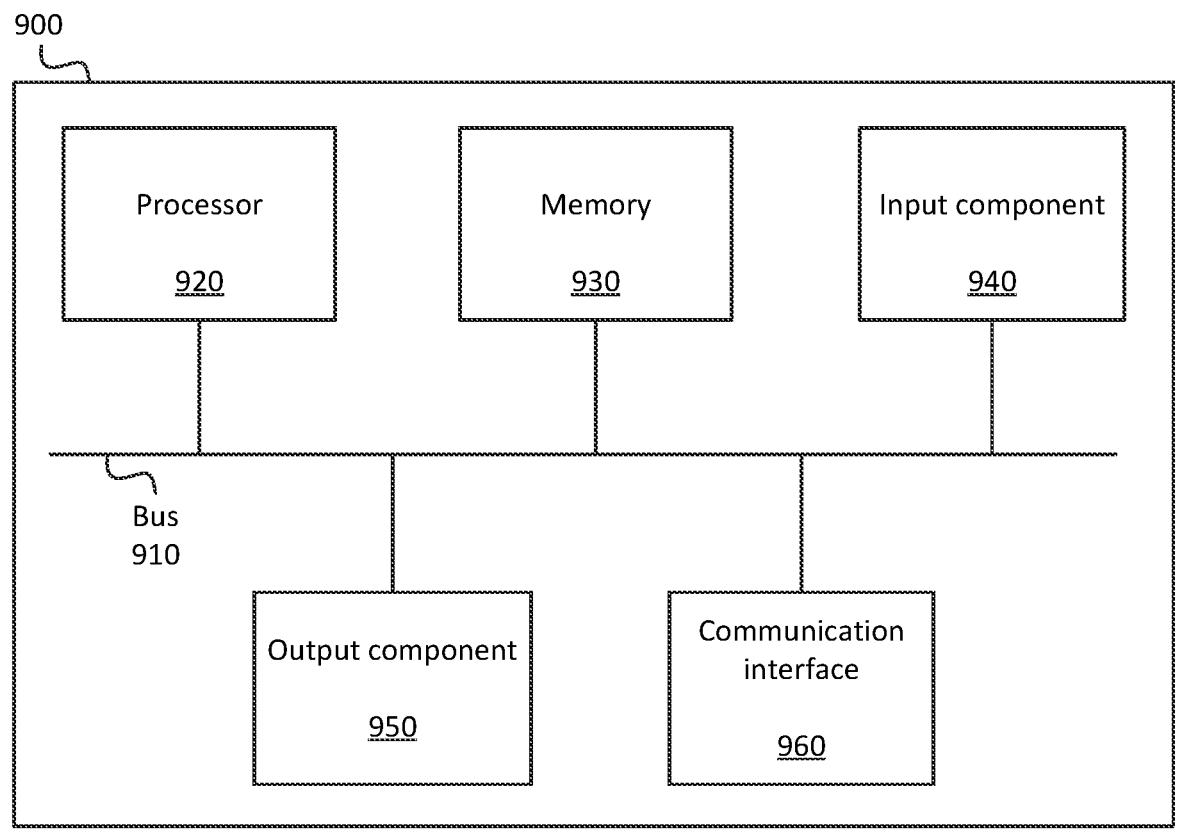
FIG. 9 illustrates example functional components of one or more devices, in accordance with one or more embodiments described herein.

FIG. 9 illustrates example components of device 900. One or more of the devices described above may include one or more devices 900. Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions. Memory 930 may include any type of dynamic storage device that may store information and instructions for execution by processor 920, and/or any type of non-volatile storage device that may store information for use by processor 920.

Input component 940 may include a mechanism that permits an operator to input information to device 900, such as a keyboard, a keypad, a button, a switch, etc. Output component 950 may include a mechanism that outputs information to the operator, such as a display, a speaker, one or more light emitting diodes ("LEDs"), etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-3 and 5-7), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information provided by individuals, it should be understood that such information shall be collected, stored, and used in accordance with all applicable laws concerning protection of personal information. Additionally, the collection, storage, and use of such information may be subject to consent of the individual to such activity (for example, through "opt-in" or "opt-out" processes, as may be appropriate for the situation and type of information). Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
    one or more processors configured to:
        receive location information indicating respective locations of a plurality of base stations associated with a wireless network;
        select, based on a first location of a first base station of the plurality of base stations and based on a second location of a second base station of the plurality of base stations, the second base station out of the plurality of base stations of the wireless network to serve as an anchor for the first base station;
        select, based on a quantity of handovers between the second base station and a third base station of the plurality of base stations, the third base station to serve an anchor for the first base station; and
        output, to the first base station, an indication that the second and third base stations are anchors with respect to the first base station.

2. The device of claim 1, wherein the first base station implements a first radio access technology ("RAT"), and wherein the second and third base stations implement a second RAT that is different from the first RAT.

3. The device of claim 2, wherein the first base station includes an evolved Node B ("eNB") and wherein the second and third base stations include Next Generation Node Bs ("gNBs").

4. The device of claim 1, wherein selecting the third base station to serve as an anchor for the first base station includes determining that the quantity of handovers, between the second base station and the third base station, exceed a threshold quantity of handovers.

5. The device of claim 1, wherein the first base station outputs an indication to one or more User Equipment ("UEs"), that are connected to the first base station, that the second and third base stations are anchors with respect to the first base station.

6. The device of claim 5, wherein outputting the indication to the one or more UEs includes outputting a Radio Resource Control ("RRC") Reconfiguration Request message to the one or more UEs.

7. The device of claim 5, wherein the one or more UEs connect to at least one of the second base station or the third base station, based on the provided indication, while remaining camped on the first base station.

8. A non-transitory computer-readable medium, storing a plurality of processor-executable instructions to:
    receive location information indicating respective locations of a plurality of base stations associated with a wireless network;
    select, based on a first location of a first base station of the plurality of base stations and based on a second location of a second base station of the plurality of base stations, the second base station out of the plurality of base stations of the wireless network to serve as an anchor for the first base station;
    select, based on a quantity of handovers between the second base station and a third base station of the plurality of base stations, the third base station to serve an anchor for the first base station; and
    output, to the first base station, an indication that the second and third base stations are anchors with respect to the first base station.

9. The non-transitory computer-readable medium of claim 8, wherein the first base station implements a first radio access technology ("RAT"), and wherein the second and third base stations implement a second RAT that is different from the first RAT.

10. The non-transitory computer-readable medium of claim 9, wherein the first base station includes an evolved Node B ("eNB") and wherein the second and third base stations include Next Generation Node Bs ("gNBs").

11. The non-transitory computer-readable medium of claim 8, wherein selecting the third base station to serve as an anchor for the first base station includes determining that the quantity of handovers, between the second base station and the third base station, exceed a threshold quantity of handovers.

12. The non-transitory computer-readable medium of claim 8, wherein the first base station outputs an indication to one or more User Equipment ("UEs"), that are connected to the first base station, that the second and third base stations are anchors with respect to the first base station.

13. The non-transitory computer-readable medium of claim 12, wherein outputting the indication to the one or more UEs includes outputting a Radio Resource Control ("RRC") Reconfiguration Request message to the one or more UEs.

14. The non-transitory computer-readable medium of claim 12, wherein the one or more UEs connect to at least one of the second base station or the third base station, based on the provided indication, while remaining camped on the first base station.

15. A method, comprising:
receiving location information indicating respective locations of a plurality of base stations associated with a wireless network;
selecting, based on a first location of a first base station of the plurality of base stations and based on a second location of a second base station of the plurality of base stations, the second base station out of the plurality of base stations of the wireless network to serve as an anchor for the first base station;
selecting, based on a quantity of handovers between the second base station and a third base station of the plurality of base stations, the third base station to serve an anchor for the first base station; and
outputting, to the first base station, an indication that the second and third base stations are anchors with respect to the first base station.

16. The method of claim 15, wherein the first base station implements a first radio access technology ("RAT"), and wherein the second and third base stations implement a second RAT that is different from the first RAT.

17. The method of claim 15, wherein selecting the third base station to serve as an anchor for the first base station includes determining that the quantity of handovers, between the second base station and the third base station, exceed a threshold quantity of handovers.

18. The method of claim 15, wherein the first base station outputs an indication to one or more User Equipment ("UEs"), that are connected to the first base station, that the second and third base stations are anchors with respect to the first base station.

19. The method of claim 18, wherein outputting the indication to the one or more UEs includes outputting a Radio Resource Control ("RRC") Reconfiguration Request message to the one or more UEs.

20. The method of claim 18, wherein the one or more UEs connect to at least one of the second base station or the third base station, based on the provided indication, while remaining camped on the first base station.

* * * * *